(12) United States Patent
Huang

(10) Patent No.: US 11,719,346 B2
(45) Date of Patent: Aug. 8, 2023

(54) WATER CONTROL VALVE WITH OFFSET VALVE CORE

(71) Applicant: Tzu-Lin Huang, Lukang Township, Changhua County (TW)

(72) Inventor: Tzu-Lin Huang, Lukang Township, Changhua County (TW)

(*) Notice: Subject to any disclaimer, the term of this patent is extended or adjusted under 35 U.S.C. 154(b) by 0 days.

(21) Appl. No.: 17/817,062

(22) Filed: Aug. 3, 2022

(65) Prior Publication Data

US 2023/0051152 A1 Feb. 16, 2023

(30) Foreign Application Priority Data

Aug. 16, 2021 (TW) .................................. 110130134

(51) Int. Cl.
  *F16K 3/24* (2006.01)
  *F16K 27/04* (2006.01)
  *F16K 31/60* (2006.01)

(52) U.S. Cl.
  CPC ............ *F16K 3/243* (2013.01); *F16K 27/041* (2013.01); *F16K 31/602* (2013.01)

(58) Field of Classification Search
  CPC ....... F16K 27/041; F16K 3/243; F16K 31/602
  See application file for complete search history.

(56) References Cited

U.S. PATENT DOCUMENTS

| 6,279,605 B1 * | 8/2001 | Wang | F16K 27/045 |
| | | | 137/454.6 |
| 10,519,746 B2 * | 12/2019 | Hollan | F16K 25/005 |

\* cited by examiner

*Primary Examiner* — Kevin R Barss
(74) *Attorney, Agent, or Firm* — Egbert, McDaniel & Swartz, PLLC

(57) ABSTRACT

A water control valve with offset valve core has a main body with a flowing slot, the circumferential wall of which is formed with a water inlet and outlet. An offset rotary valve core is configured offset inside the flowing slot and has a rotary shaft and a water stopping seat. The face of the water stopping seat faces the circumferential wall and has a sealing ring. When the water stopping seat rotates along with the offset rotary valve core and is aligned with the inlet, the sealing ring is pressed against the circumferential wall to close the inlet, thus forming the water stop mode. The rotary shaft and the circumferential wall of the flowing slot define a flowing space. The flow from the inlet must pass through the flowing space and exit through the outlet. A dialing component is used to connect and drive offset rotary valve core.

4 Claims, 6 Drawing Sheets

WATER CONTROL VALVE WITH OFFSET VALVE CORE

CROSS-REFERENCE TO RELATED U.S. APPLICATIONS

Not applicable.

BACKGROUND OF THE INVENTION

1. Field of the Invention

The present invention relates generally to a water control valve, and more particularly to an innovative water control valve with offset valve core.

2. Description of Related Art Including Information Disclosed Under 37 CFR 1.97 And 37 CFR 1.98

Normally, in the structural design of a conventional water control valve, a rotation body (such as a valve ball or a valve pole) is configured inside a round valve slot, and the rotation body is configured with a flowing passage. The water flow is controlled through the rotational angle and alignment between the flowing passage and the water inlet and outlet of the valve slot. Such a structure can be used to turn on/off the water flow and control the flow rate.

In the conventional design of the rotation body with the configuration of a flowing passage, the rotation body occupies a large space to allow sufficient strength, which results in the limitation of the flow capacity. Moreover, as the water flow is controlled through the alignment between the flowing passage and the water inlet and outlet, the positions of the water inlet and outlet must be completely adapted to the flowing passage of the rotation body. As a result, when multiple angles between the water inlet and outlet are required for particular products, the rotation body has to be formed and manufactured with multiple types of flowing passage. This will apparently increase the production cost and difficulty. In addition, the conventional water control valve still has some problems in some application environments. For example, in the case of a water spraying gun, the water flow is usually controlled by a trigger structure. In actual operations, the user will find it difficult to control the flow rate. And the user must use his/her finger to continuously apply a pressing force. Such an inconvenience must be improved.

BRIEF SUMMARY OF THE INVENTION

The main object of the present invention is to provide a water control valve with offset valve core, aiming to make a breakthrough and solve the above-mentioned technical problem by developing an ideally practical new-style water control valve.

Based on the above object, the problem-solving technical feature of the present invention lies mainly in that the water control valve with offset valve core comprises a main body, with its inside formed with a flowing slot. The flowing slot has a circumferential wall, and the different positions of the circumferential wall are formed with a water inlet and a water outlet to guide the water flow going inward and outward. An offset rotary valve core is configured inside the flowing slot and comprises a rotary shaft and a water stopping seat radially configured on a partial area of the rotary shaft in the form of a protruding cylinder. The offset rotary valve core is offset in relation to the flowing slot. The water stopping seat has a water stopping face facing the circumferential wall. The outer diameter of the water stopping face is larger than the diameter of the water inlet hole, and the water stopping face is installed with a sealing ring. When the water stopping seat rotates along with the offset rotary valve core and is aligned to the water inlet passage, the sealing ring and circumferential wall is tightly sealed with the water inlet passage, thus forming a water stop mode. The rotary shaft, the water stopping seat and the circumferential wall of the flowing slot define a flowing space. The water flow coming in from the water inlet must flow through the flowing space and go out from the water outlet. In the water stop mode, the radial section of the flowing space is in the shape of a C. A dialing component is configured outside the main body, and the dialing component is used to connect and drive offset rotary valve core.

The efficacy and advantage of the present invention is that it offers more flexibility for the allocation of the water inlet and water outlet to adapt to multiple types of flow channels, thus effectively saving the molding and manufacturing costs of the rotary valve cores. In the flowing slot, the offset rotary valve core only seals the water inlet to realize the water stop mode. This innovative design allows the invention to be applied in wider areas and makes it more economically beneficial. Moreover, as the offset rotary valve core will not occupy the whole space of the flowing slot, the flow capacity can be better than the prior-art structure. This is truly a great advantage and practical inventive step.

DETAILED DESCRIPTION OF THE INVENTION

Figure 1:
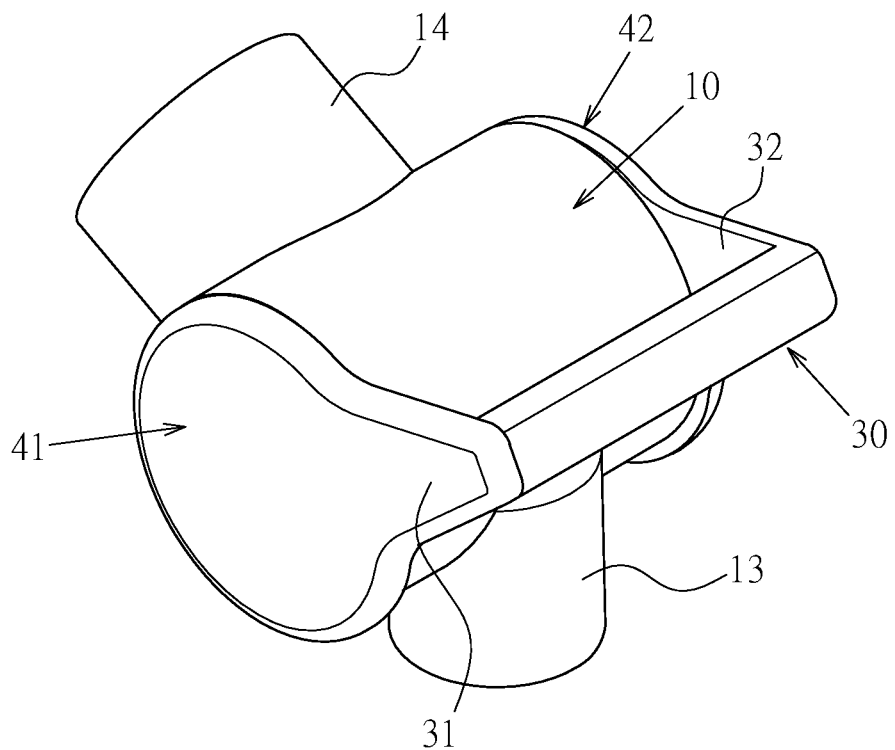
FIG. 1 is a combined perspective view of a preferred embodiment of the invention.

Depicted in FIG. 1 to FIG. 5 is a preferred embodiment of the present invention of a water control valve with offset valve core. However, such embodiment is for illustrative purpose only and is not intending to limit the scope of the patent.

The water control valve with offset valve core comprises a main body 10, with its inside formed with a flowing slot 11. The flowing slot 11 has a circumferential wall 12, and the different positions of the circumferential wall 12 are formed with a water inlet 13 and a water outlet 14 to guide the water flow W going inward and outward. An offset rotary valve core 20 is configured inside the flowing slot 11. The offset rotary valve core 20 comprises a rotary shaft 21 and a water stopping seat 22 radially configured on a partial area of the rotary shaft 21 in the form of a protruding cylinder. The offset rotary valve core 20 is offset in relation to the flowing slot 11. The water stopping seat 22 has a water stopping face 221 facing the circumferential wall 12. The outer diameter of the water stopping face 221 is larger than the diameter of the water inlet 13, and the water stopping face 221 of the water stopping seat 22 is installed with a sealing ring 23. When the water stopping face 221 of the water stopping seat 22 rotates along with the offset rotary valve core 20 and is aligned to the water inlet 13, the sealing ring 23 is tightly sealed with the circumferential wall 12 to close the water inlet 13, thus forming the water stop mode. The rotary shaft 21, the water stopping seat 22 and the circumferential wall 12 of the flowing slot 11 defines a flowing space 15. The water flow W going into the water inlet 13 must pass through the flowing space 15 and flow out from the water outlet 14. In the water stop mode, the radial section of the flowing space 15 is in the shape of a C. A dialing component 30 is configured outside the main body 10. The dialing component 30 is used to connect and drive the offset rotary valve core 20.

Figure 3:
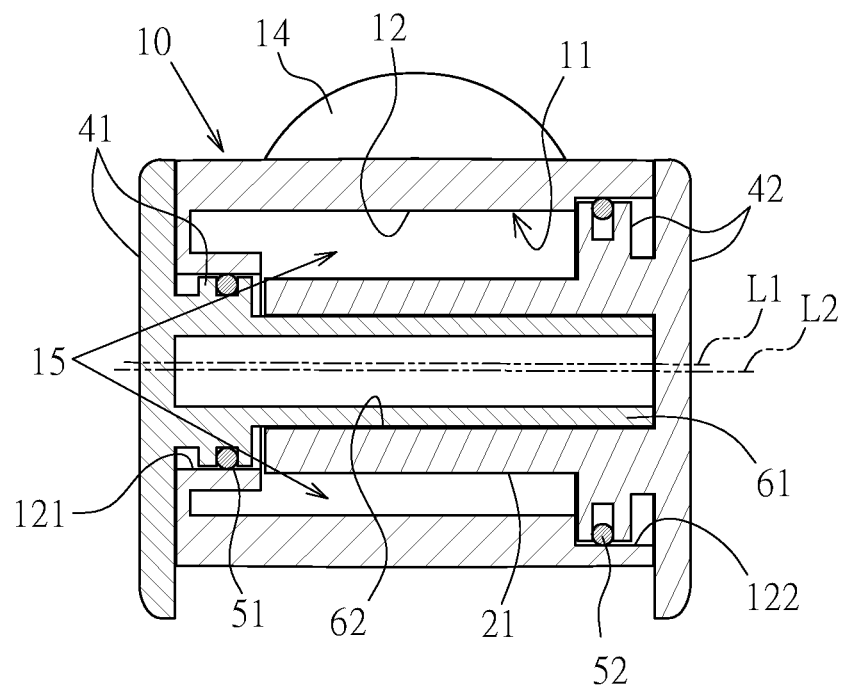
FIG. 3 is a first-side combined sectional view of a preferred embodiment of the invention.
Figure 4:
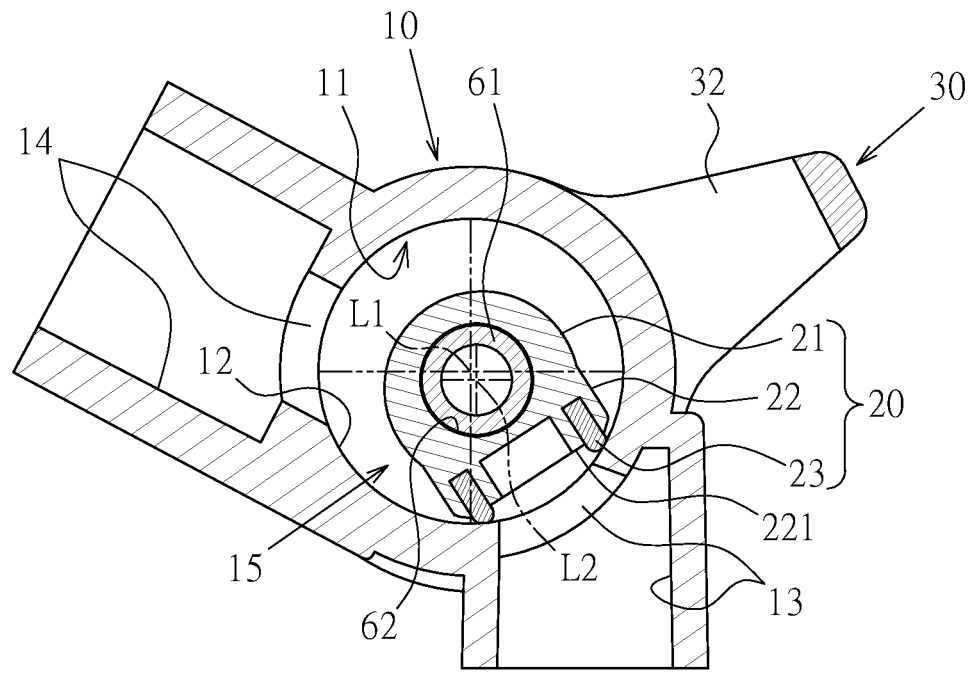
FIG. 4 is a second-side combined sectional view of a preferred embodiment of the invention.
Figure 6:
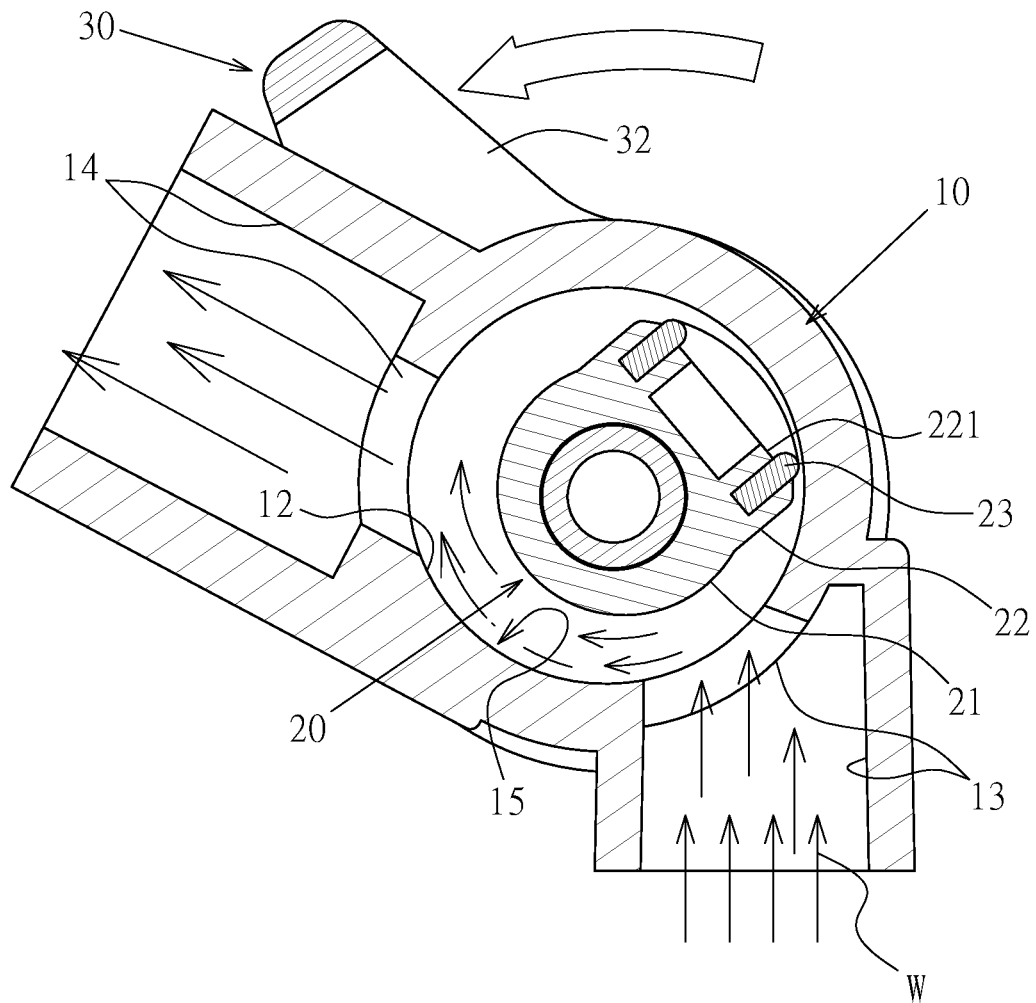
FIG. 6 is a diagrammatic view of a preferred embodiment of the invention showing the gap generated between the sealing ring and the circumferential wall when the water stopping seat moves away from the water inlet.

Referring to FIG. 3 and FIG. 4, in the present embodiment, the center of the flowing slot 11 defines a virtual center line L1. The rotary shaft 21 defines an axial center line L2. The axial center line L2 is located inside the flowing slot 11 offset from the center line L1 at a preset distance. In the present embodiment, through the offset deployment of the offset rotary valve core 20, when the water stopping seat 22 rotates to be aligned with the water inlet 13, as shown in FIG. 4, the distance between the water stopping seat 22 and the circumferential wall 12 is smallest, and the sealing ring 23 is tightly pressed against the circumferential wall 12 to close the water inlet 13, thus forming the water stop mode. On the contrary, when the water stopping seat 22 goes away from the water inlet 13, as shown in FIG. 6, there will be a gap between the sealing ring 23 and the circumferential wall 12. As a result, because the sealing ring 23 is not always pressed, it will be elastically released during the displacement. This will help extend the life cycle of the sealing ring 23.

Figure 2:
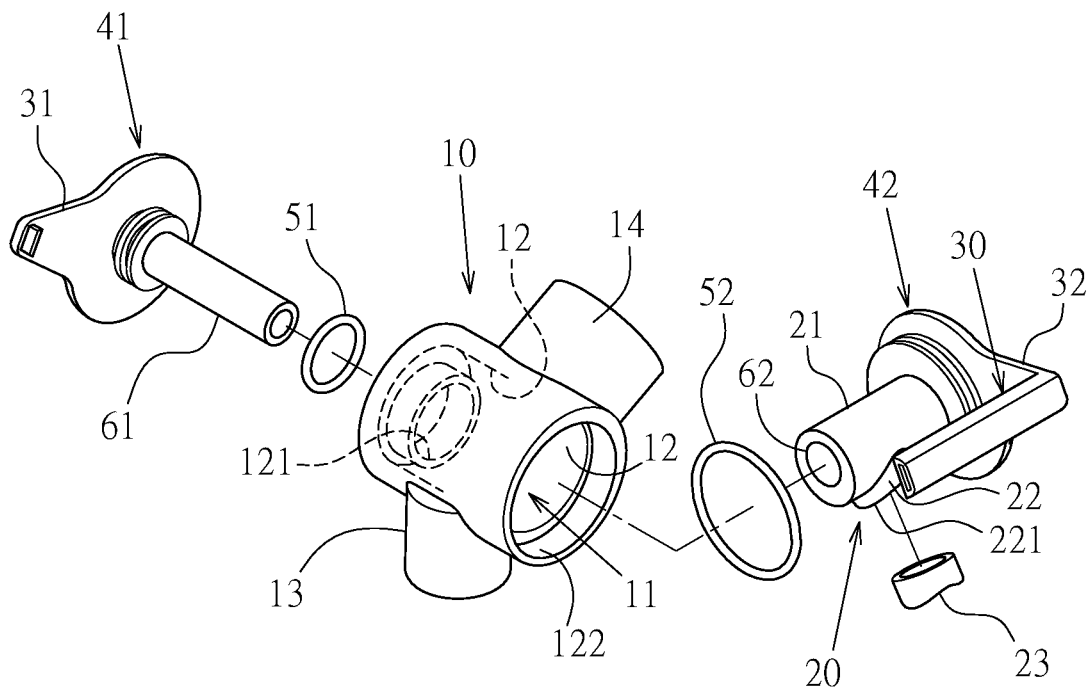
FIG. 2 is an exploded perspective view of a preferred embodiment of the invention.

Referring to FIG. 2 and FIG. 3, in the present embodiment, one end of the rotary shaft 21 of the offset rotary valve core 20 has a first lateral disc seat 41. The first lateral disc seat 41 is spirally configured on a first supporting ring edge 121 formed on one end of the circumferential wall 12, and the periphery of the first lateral disc seat 41 is configured with a first sealing ring 51, forming a matching relationship with the first supporting ring edge 121 for water sealing by rotation. Furthermore, one end of the first lateral disc seat 41 is formed with a first combination positioning part 61. The other end of the rotary shaft 21 has a second lateral disc seat 42 spirally configured on a second supporting ring edge 122 formed on the other end of the circumferential wall 12. The periphery of the second lateral disc seat 42 is configured with a second sealing ring 52 to form a matching relationship with the second supporting ring edge 122 for water sealing by rotation. The rotary shaft 21 is formed with a second combination positioning part 62, which is assembled and fixed with the first combination positioning part 61. (Note: In the present embodiment, the axial center lines L2 of the first supporting ring edge 121, the second supporting ring edge 122 and the rotary shaft 21 are concentric, and the first supporting ring edge 121, the second supporting ring edge 122 and the flowing slot 11 are offset and eccentric.)

Referring to FIG. 1 and FIG. 2, in the present embodiment, the dialing component 30 has a first terminal leg 31 and a second terminal leg 32, the first terminal leg 31 is connected to the first lateral disc seat 41, and the second terminal leg 32 is connected to the second lateral disc seat 42.

Referring to FIG. 2 and FIG. 3, in the present embodiment, the first combination positioning part 61 and the second combination positioning part 62 are in male and female shapes (such as the convex column and concave slot shown in the Figure) matching each other for insertion and assembly.

Figure 7:
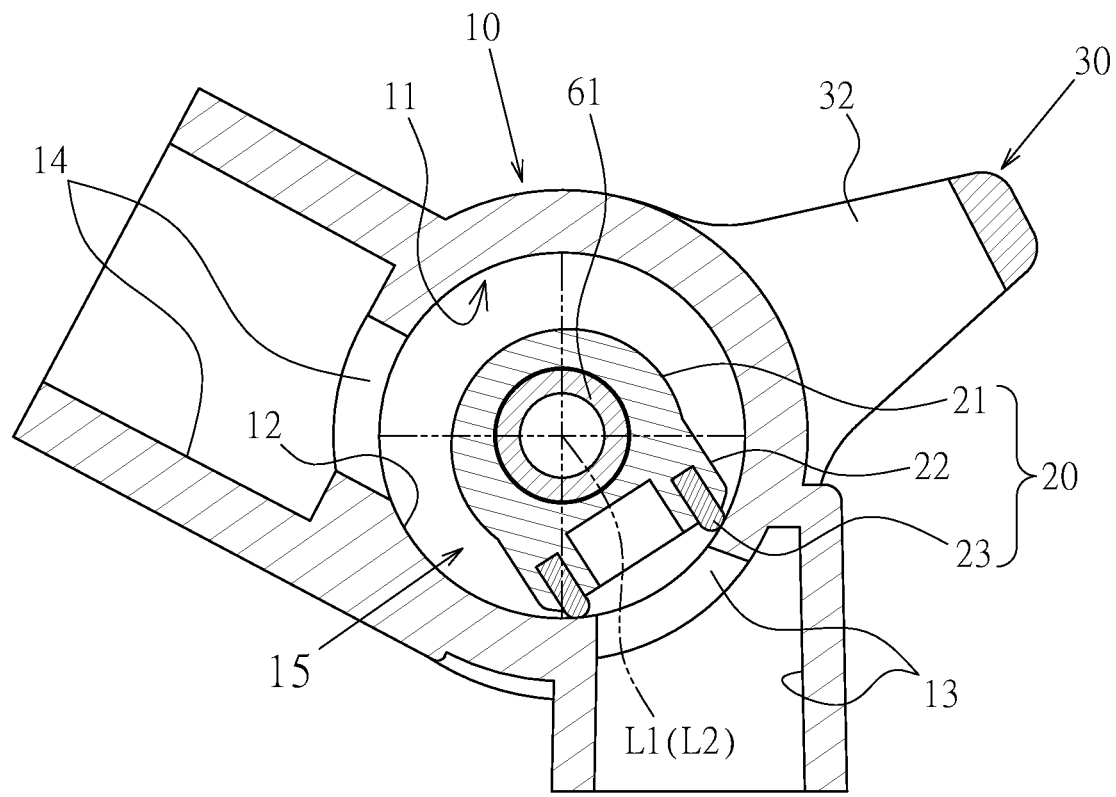
FIG. 7 is an embodiment view of the invention showing the center line of the flowing slot being concentric with the axial line of the rotary shaft.

Referring to FIG. 7, in the present embodiment, the center of the flowing slot 11 defines a virtual center line L1, the rotary shaft 21 defines an axial center line L2, and the axial center line L2 and the center line L1 are concentric. The operation of the present embodiment differs from the above embodiment disclosed in FIG. 3 and FIG. 4 in that: if, in the present embodiment, the circumferential wall 12 of the flowing slot 11 is configured to be round, when the rotary shaft 21 drives the water stopping seat 22 to be displaced, a constant sealing tightness will be maintained between the sealing ring 23 and circumferential wall 12. The design disclosed in the present embodiment also falls within the scope of the invention.

Figure 5:
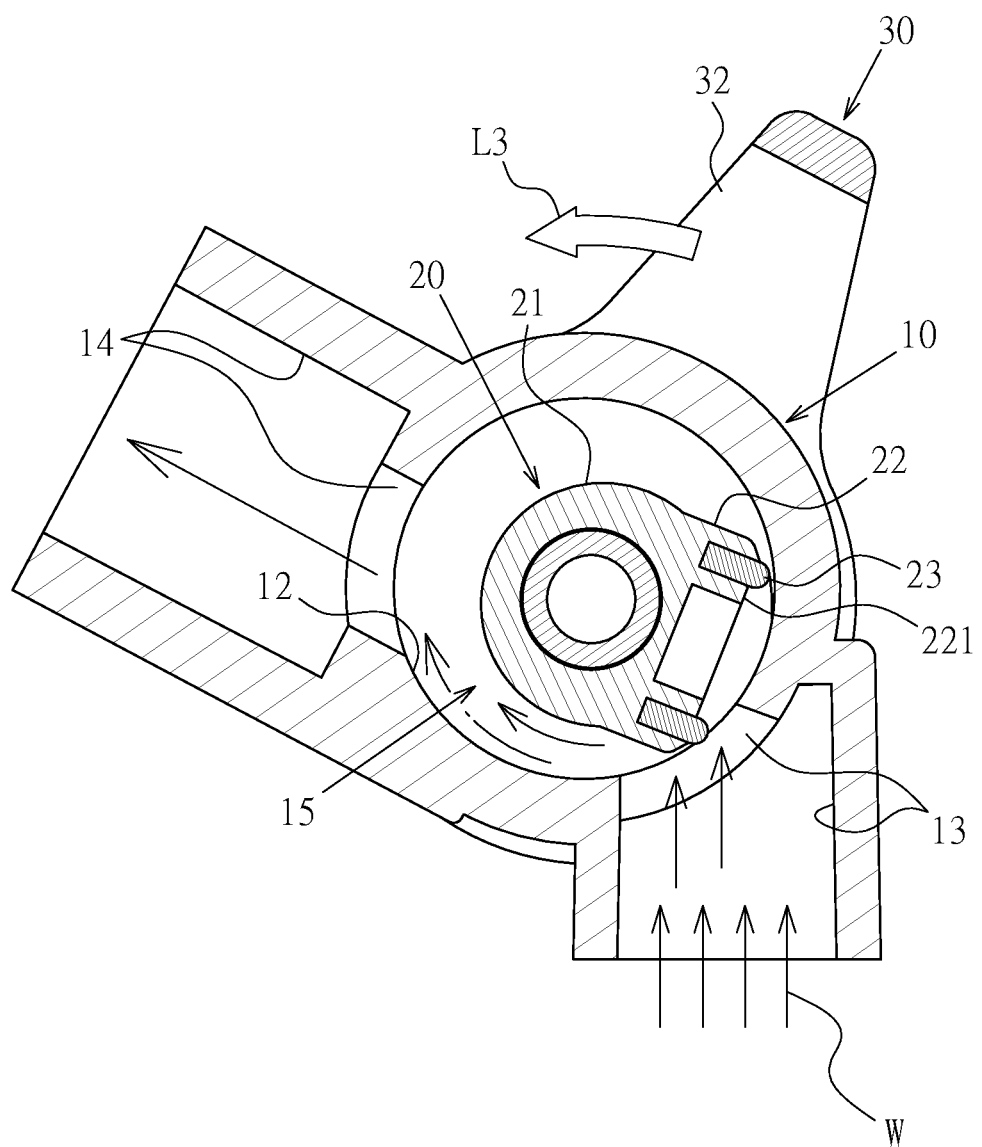
FIG. 5 is a diagrammatic view of a preferred embodiment of the invention showing the stepless control of outgoing water by the dialing component.
Figure 8:
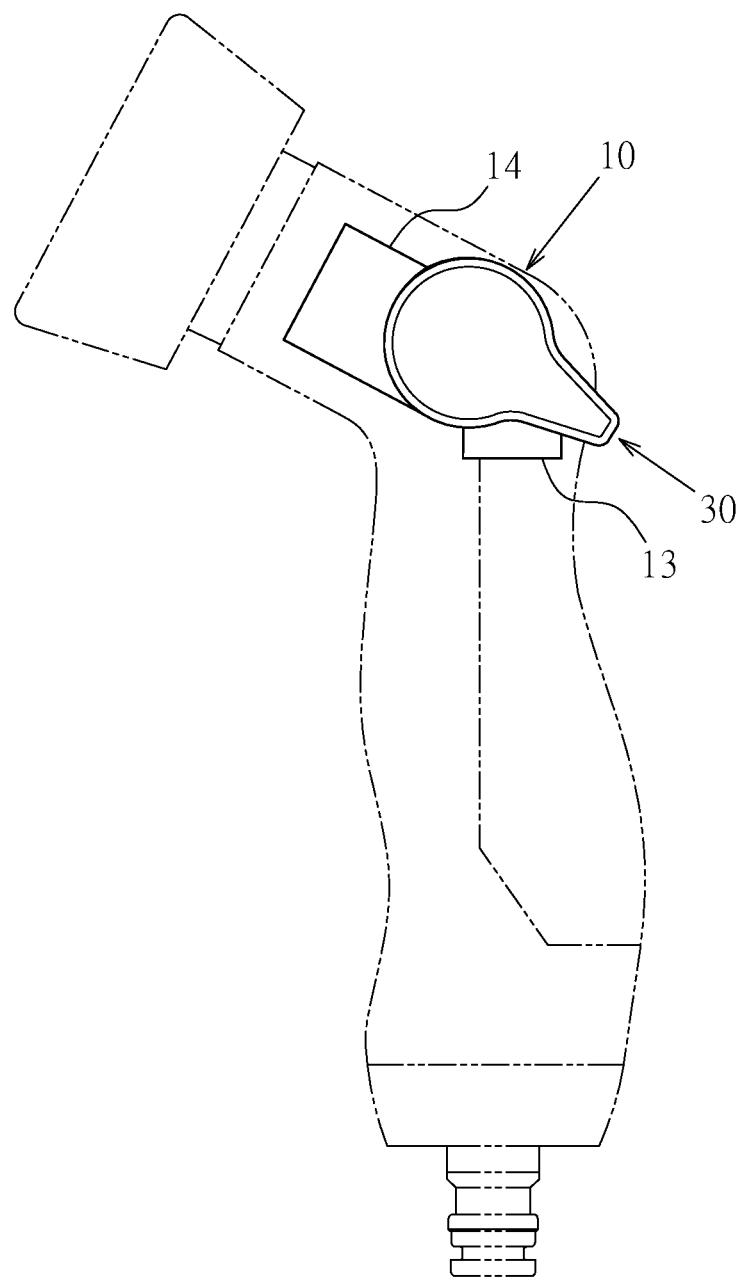
FIG. 8 is an embodiment view of the invention showing application of the water control valve with offset valve core in the structure of a water spraying gun.

Based on the structural design and technical features described above, the actual usage of the water control valve with offset valve core of the present invention is as follows: as shown in FIG. 5, to control the water flow, the user can apply a force to push the dialing component 30 (in the direction indicated by Arrow L3), and the flow capacity can be controlled in through stepless rotation. Moreover, in the water control valve with offset valve core of the invention, the offset rotary valve core 20 in the flowing slot 11 can realize the water stop mode simply by closing the water inlet 13, the configuration relationship between the water inlet 13 and the water outlet 14 becomes more flexible. Thus, the present invention can be applied in multiple types of flow passage configurations, and can effectively reduce the molding and production costs of the rotary valve core. Therefore, the present invention has wider application range and better economical advantage. The water control valve with offset valve core disclosed in FIG. 8 is a diagrammatic view of an embodiment applied in the structure of a handheld water spraying gun. Furthermore, because the offset rotary valve core 20 is configured in an offset style, it will not occupy the whole space of the flowing slot 11. Therefore, the present invention can offer better flow capacity than the prior-art structure. The enhanced flow capacity is apparently another big advantage.

I claim:

1. A water control valve with offset valve core, comprising:
   a main body, with its inside formed with a flowing slot, the flowing slot comprises a circumferential wall, the circumferential wall is formed with a water inlet and a water outlet at different positions to guide the water flow (W) going inward and outward;
   an offset rotary valve core, configured inside the flowing slot, the offset rotary valve core comprises a rotary shaft and a water stopping seat radially configured on a partial area of the rotary shaft in the form of a protruding cylinder, the offset rotary valve core is offset in relation to the flowing slot, the water stopping seat has a water stopping face facing the circumferential wall, the outer diameter of the water stopping face is larger than the diameter of the water inlet, and the water stopping face of the water stopping seat is installed with a sealing ring, when the water stopping face of the water stopping seat rotates along with the offset rotary valve core and is aligned with the water inlet, the sealing ring is tightly pressed against the circumferential wall to close the water inlet, thus forming the water stop mode, the rotary shaft, the water stopping seat and the circumferential wall of the flowing slot define a flowing space, the water flow (W) going into the water inlet must pass through the flowing space and go out from the water outlet, in the water stop mode, the radial section of the flowing space is in the shape of a C; and a dialing component, configured outside the main body, and the dialing component is used to connect and drive the offset rotary valve core;

the center of the flowing slot defines a center line, the rotary shaft defines an axial center line, and the axial center line is located inside the flowing slot offset from the center line at a preset distance; when the water stopping seat is rotated and aligned with the water inlet, the distance between the water stopping seat and the circumferential wall is smallest; when the water stopping seat moves away from the water inlet, a gap is formed between the sealing ring and the circumferential wall.

2. The water control valve with offset valve core defined in claim 1, wherein one end of the rotary shaft of the offset rotary valve core has a first lateral disc seat, the first lateral disc seat is spirally configured on a first supporting ring edge formed on one end of the circumferential wall, and the periphery of the first lateral disc seat is configured with a first sealing ring, which forms a matching relationship with the first supporting ring edge for water sealing by rotation; one end of the first lateral disc seat is formed with a first combination positioning part, whereas the other end of the rotary shaft has a second lateral disc seat spirally configured on a second supporting ring edge formed on the other end of the circumferential wall; the periphery of the second lateral disc seat is configured with a second sealing ring to form a matching relationship with the second supporting ring edge for water sealing by rotation; the rotary shaft is formed with a second combination positioning part, which is assembled and fixed with the first combination positioning part.

3. The water control valve with offset valve core defined in claim 2, wherein said dialing component has a first terminal leg and a second terminal leg, the first terminal leg is connected to the first lateral disc seat, and the second terminal leg is connected to the second lateral disc seat.

4. The water control valve with offset valve core defined in claim 2, wherein the first combination positioning part and the second combination positioning part are in male and female shapes for combination by insertion.

* * * * *